United States Patent
Jaiswal et al.

(10) Patent No.: US 11,640,399 B2
(45) Date of Patent: May 2, 2023

(54) DATABASE QUERY PROCESSING FOR DATA IN A REMOTE DATA STORE

(71) Applicant: TERADATA US, INC., San Diego, CA (US)

(72) Inventors: Naveen Jaiswal, Telangana (IN); Kishore Chilagani, Hyderabad (IN); Vivek Kumar, Jharkhand (IN); Sanjib Kumar Mishra, Telengana (IN)

(73) Assignee: Teradata US, Inc., San Diego, CA (US)

( * ) Notice: Subject to any disclaimer, the term of this patent is extended or adjusted under 35 U.S.C. 154(b) by 139 days.

(21) Appl. No.: 17/115,909

(22) Filed: Dec. 9, 2020

(65) Prior Publication Data

US 2022/0179864 A1 Jun. 9, 2022

(51) Int. Cl.
*G06F 15/16* (2006.01)
*G06F 16/2453* (2019.01)

(52) U.S. Cl.
CPC .............. *G06F 16/24545* (2019.01)

(58) Field of Classification Search
None
See application file for complete search history.

(56) References Cited

U.S. PATENT DOCUMENTS

| | | | | |
|---|---|---|---|---|
| 2003/0028509 A1* | 2/2003 | Sah | ............ | G06F 16/284 |
| 2005/0097084 A1* | 5/2005 | Balmin | ............ | G06F 16/8365 |
| 2007/0192296 A1* | 8/2007 | Burger | ............ | G06F 16/24549 |
| 2010/0281029 A1* | 11/2010 | Parikh | ............ | G06Q 30/02 |
| | | | | 707/769 |
| 2011/0313999 A1* | 12/2011 | Bruno | ............ | G06F 16/24542 |
| | | | | 707/718 |
| 2015/0169686 A1* | 6/2015 | Elias | ............ | G06F 16/24542 |
| | | | | 707/718 |
| 2020/0050694 A1* | 2/2020 | Avalani | ............ | G06F 16/2455 |
| 2022/0075768 A1* | 3/2022 | Geiselhart | ............ | G06F 16/2386 |

OTHER PUBLICATIONS

Apache Software Foundation, Apache Parquet (http://parquet.apache.org), 2018 (9 pages).
Wikipedia, Comma-separated values last edited on Oct. 30, 2020 (12 pages).
Wikipedia, JSON last edited on Nov. 21, 2020 (21 pages).

* cited by examiner

*Primary Examiner* — Alex Gofman
(74) *Attorney, Agent, or Firm* — Trop, Pruner & Hu, LLP

(57) ABSTRACT

In some examples, a database system identifies a plurality of query portions in a database query that contain references to a first external table, the first external table being based on data from a remote data store coupled to the database system over a network. The database system creates a common spool portion that includes projections and selections of the plurality of query portions, and rewrites the plurality of query portions into rewritten query portions that refer to a spool containing an output of the common spool portion. For execution of the database query, the database system determines, as part of optimizer planning, whether to use the plurality of query portions or the common spool portion and the rewritten query portions.

17 Claims, 4 Drawing Sheets

DATABASE QUERY PROCESSING FOR DATA IN A REMOTE DATA STORE

BACKGROUND

A relational database management system (DBMS) stores databases that include collections of logically related data arranged in a predetermined format, such as in tables that contain rows and columns. To access the content of a table in a database, database queries according to a standard database query language (such as the Structured Query Language or SQL) are submitted to the database. A database query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

Figure 1:
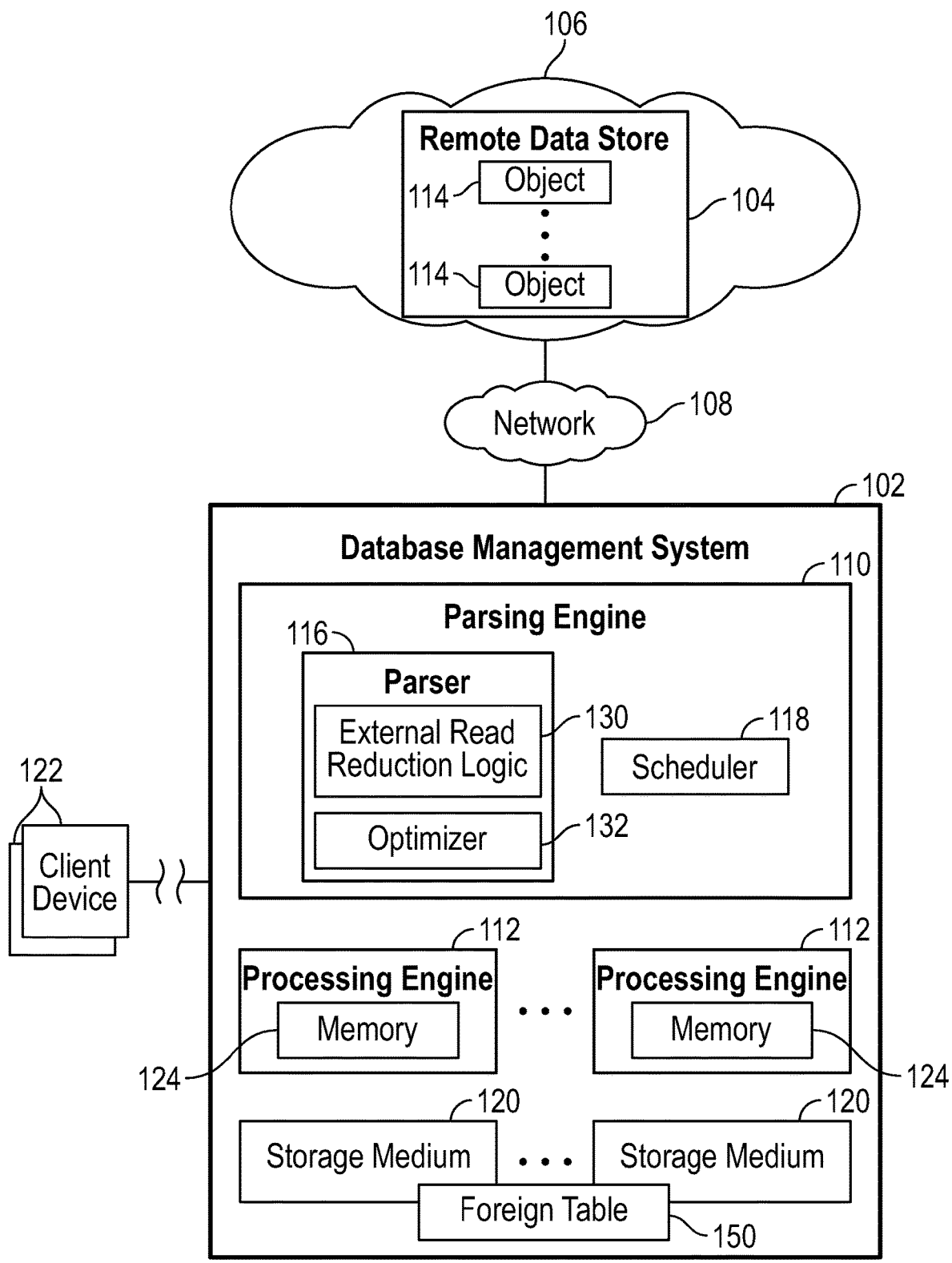
FIG. 1 is a block diagram of an example arrangement that includes a database management system and a remote data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote data store 104. In some examples, the remote data store 104 is an object store that stores objects 114. As used here, an "object" can refer to any separately identifiable or addressable unit of data.

In some examples, the remote data store 104 can be accessible in a cloud 106. A "cloud" can refer to any infrastructure, including computing, storage, and communication resources, that can be accessed remotely by devices over a network, such as a network 108 shown in FIG. 1. Alternatively, the remote data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The DBMS 102 includes a parsing engine 110 that is able to process database queries, such as SQL queries, load requests, and so forth. SQL queries can include data definition language (DDL) statements and data manipulation language (DML) statements.

In addition to the parsing engine 110, the DBMS 102 includes multiple processing engines 112, in some examples. In other examples, the DBMS 102 can include just one processing engine 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., data records of different objects 114, data records of different portions of objects 114) of the remote data store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

As used here, a "data record" can refer to any unit of data that can be processed by the DBMS 102. For example, the data record can be in the form of a row of a table, a table, a materialized view, or any other piece of data. Each data record can have multiple attributes. In a table row, the multiple attributes can be the multiple columns of the table row. Each attribute is assigned a value in the corresponding data record.

Traditionally, a DBMS stores data in relational databases stored in a block-based storage, in which data is stored as blocks that are smaller in size than objects of object stores. For example, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, instead of or in addition to coupling block-based storage to the DBMS 102, the DBMS 102 can work with the remote data store 104, which can be provided in the cloud 106 or another remote computing environment. In such examples, local block-based storage may not be used with the DBMS 102 to store certain relational tables. The objects 114 of the remote data store 104 can have variable sizes, and each object can have a size between 10 megabytes (MB) and 100 MB. In other examples, an object can have a smaller or larger size. An object in an object store is typically larger in size than data records (e.g., rows, tables, etc.) stored in a local block-based storage.

Objects stored in the remote data store 104 can include structured data (e.g., data in a database relational format) and unstructured data (which can be in the form of large files having formats, such as a comma-separated values (CSV) format, a JavaScript Object Notation (JSON) format, an Apache Parquet format, etc.).

When responding to a database query (or more simply, a "query"), the DBMS 102 can access (write or read) data of the remote data store 104, rather than data in a relational table (or relational tables) of a local block-based storage. When processing a query on data in the remote data store 104, the DBMS 102 may fetch objects from an external location (specified by the query) at the remote data store 104.

A source of a database query can be a user, a program, or a machine. Some database queries can be relatively complex, which can involve joins of different tables to find answers for the database queries.

In some cases, a database query can refer to an external table at multiple places within the database query. An "external table" refers to a table derived from one or more objects 114 stored in the remote data store 104. In some cases, an object 114 that is not in a relational table format may be converted by DBMS 102 into a relational table format before processing of a database query by the parsing engine 110. In other cases, an object 114 can store a relational table, which can be directly processed by the parsing engine 110.

In some cases, the same external table may appear in multiple places within a database query with the same or different projections and/or selections. The database query can include multiple clauses containing query logic that refer to tables. At least some of the tables referred to by the clauses are external tables. Query logic in different clauses may refer to the same external table.

A "projection" refers to projecting selected one or more columns (or attributes) of a table in a database query. A "selection" refers to selection of rows (or tuples) of a table that satisfy a predicate of the database query. A "predicate" of a database query refers to a condition in the database query that rows of the table are to satisfy before the rows are selected for inclusion in an answer to the database query.

Accessing an object 114 from the remote data store 104 over the network 108 by the DBMS 102 can be expensive in terms of network bandwidth usage, latency, and processing resource usage. An object 114 can be relatively large, such that retrieving the object 114 over the network 108 can be slow and can cause the network 108 to become overloaded or otherwise reduce network bandwidth for other data communications.

Also, each time an object 114 is retrieved by the DBMS 102 from the remote data store 104, the DBMS 102 may have to apply certain processing to the object 114 before the parsing engine 110 of the DBMS 102 is able to process the data of the object 114 for a database query. Such processing of the same object 114 for multiple references in the database query can be expensive in terms of processing resource used.

In accordance with some implementations of the present disclosure, an external read reduction logic 130 is provided in a parser 116 of the parsing engine 110. The external read reduction logic 130 can cooperate with an optimizer 132 in the parser 116 to reduce a number of reads of objects 114, under certain conditions, when executing a database query received by the DBMS 102.

The parser 116 receives database queries (such as SQL queries, load requests, etc.) submitted by one or more client devices 122, which may be coupled to the DBMS 102 over an interconnect (e.g., the network 108 or another link). The parser 116 parses each received database query, and generates executable steps for the parsed query. The optimizer 132 generates multiple query plans in response to a database query. The optimizer 132 selects the most efficient query plan from among the multiple query plans. Each query plan includes a sequence of executable steps to perform to process the database query.

A scheduler 118 in the parsing engine 110 sends the executable steps of the selected query plan to respective processing engines 112. Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

The DBMS 102 is able to access the remote data store 104 using a foreign table 150. The foreign table 150 stores information identifying the location of the remote data store 104. The foreign table 150 does not include the actual data of each object 114, such that the foreign table 150 is much smaller in size than the collection of the objects 114 in the data store 104.

In examples where there are multiple processing engines 112, the foreign table 150 can be distributed across respective storage media 120 that are associated with the corresponding processing engines 112. Each storage medium 120 is associated with a respective processing engine 112, such that the processing engine 112 is able to manage access of data in the associated storage medium 120. The storage medium 120 can refer to a physical storage device (or group of physical storage devices) or to a logical storage device.

Figure 2:
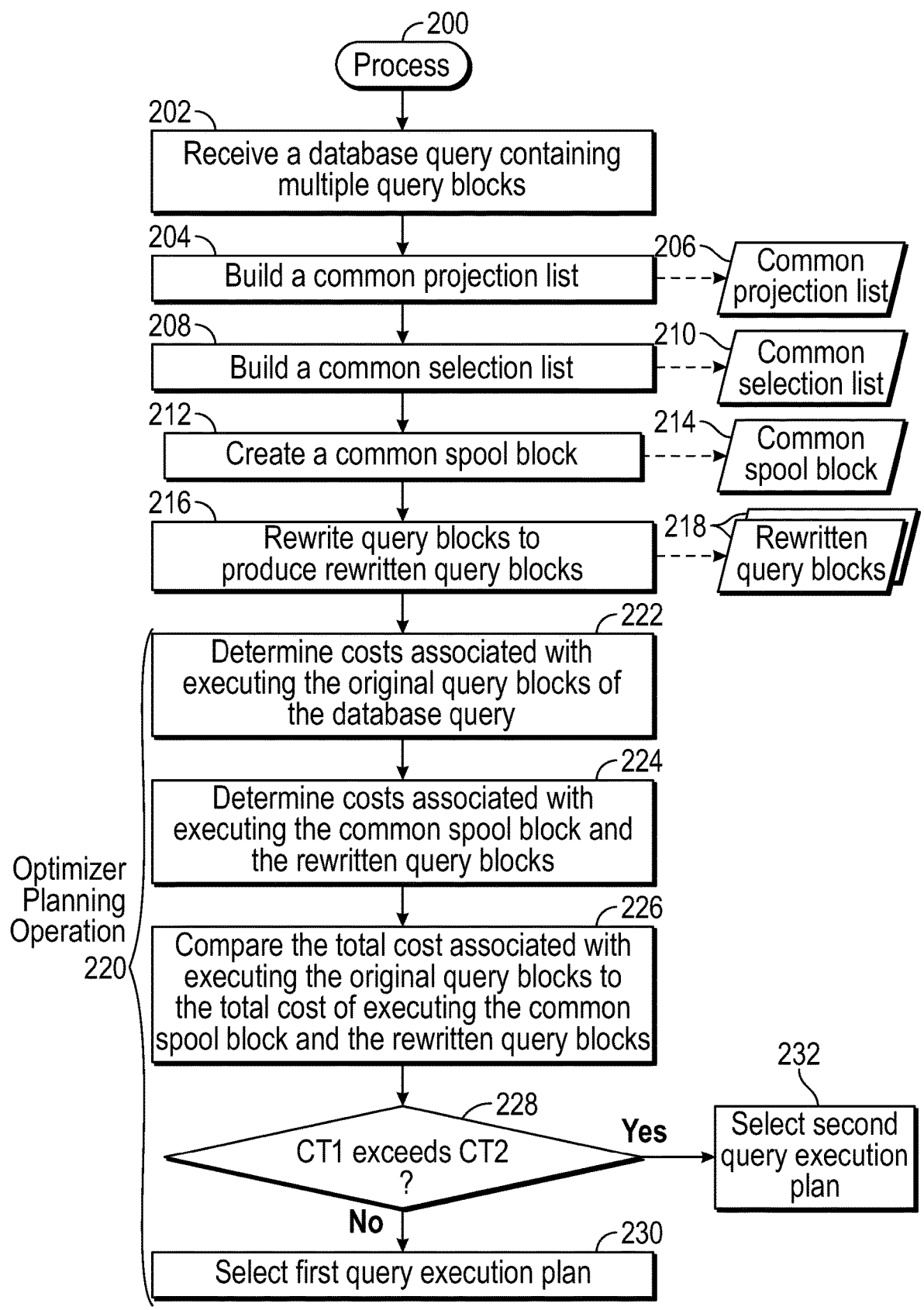
FIG. 2 is a flow diagram of an example process according to some implementations of the present disclosure.

FIG. 2 is a flow diagram of a process 200 performed by the parser 116 according to some implementations of the present disclosure. Although FIG. 2 shows a sequence of tasks, it is noted that the tasks of FIG. 2 can be performed in a different order in other examples, and/or some tasks may be omitted, and/or additional or replacement tasks may be used.

The parser 116 receives (at 202) a database query that contains multiple query blocks that refer to respective tables. A "query block" refers to a portion (e.g., a clause or a part of a clause) of a database query that contains query logic, including one or more projections, one or more selections based on a predicate, and other query logic.

Figure 3:
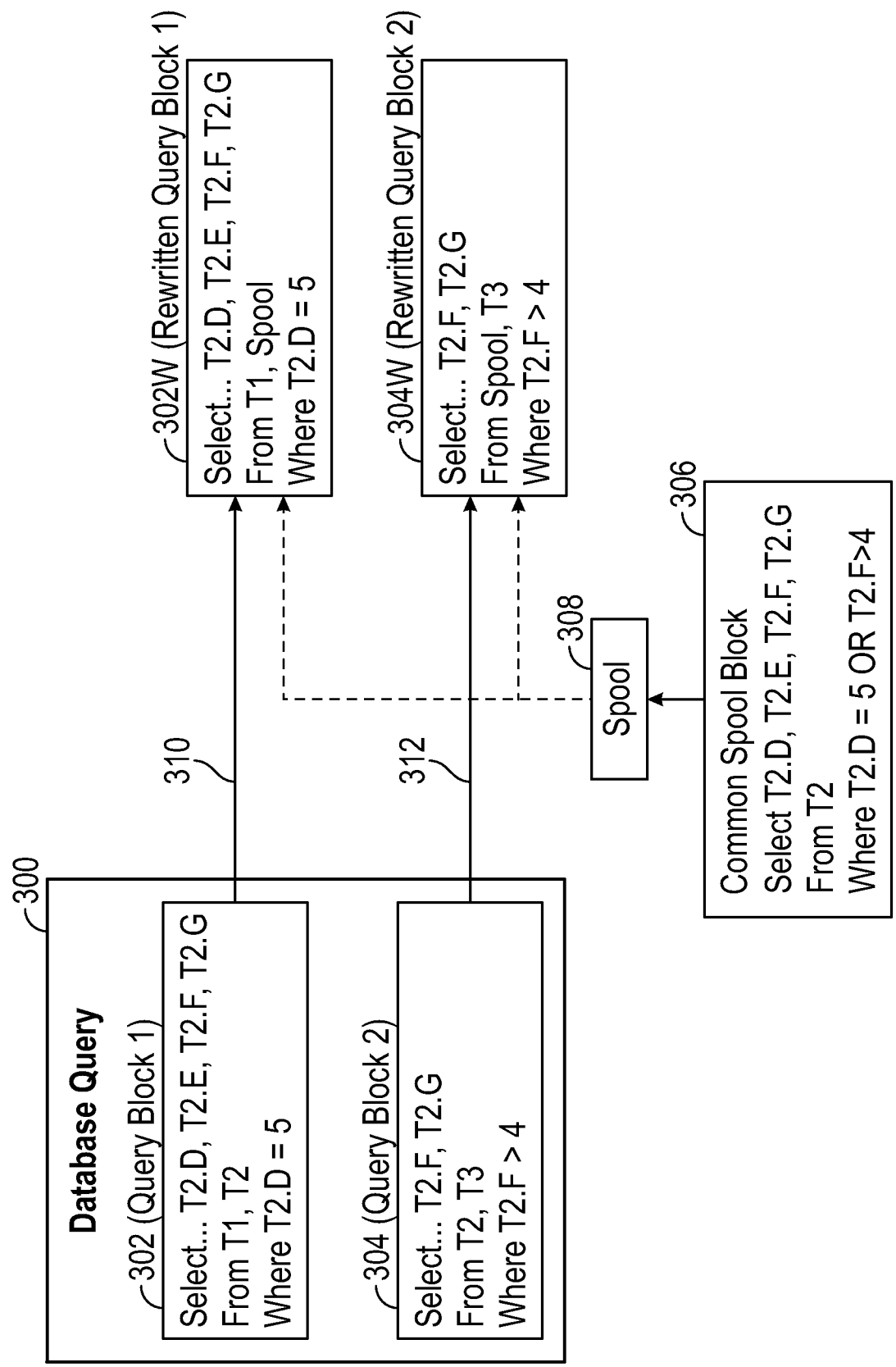
FIG. 3 is a block diagram showing original query blocks, rewritten query blocks, and a common spool block, according to some implementations of the present disclosure.

Referring further to FIG. 3, an example database query 300 includes two example query blocks 302 and 304. The query block 302 includes query logic for performing a join of tables T1 and T2. In the query block 302, the SELECT clause projects columns T2.D, T2.E, T2.F, and T2.G, which are columns of table T2. The WHERE clause is a predicate of the query logic in the query block 302. The predicate specifies that a join of the tables T1 and T2 is performed if the column T2.D is equal to the value 5.

The query block 304 contains query logic for performing a join of tables T2 and T3. In the query block 304, the SELECT clause projects columns T2.F and T2.G, and the WHERE clause is a predicate that specifies that a join of the tables T2 and T3 is performed if the column T2.F is greater than the value 4.

In the example of FIG. 3, it is assumed that tables T1, T2, and T3 are external tables. The data of each table T1 or T2 or T3 is stored in one or more objects 114 of the remote data store 104. Note that in some examples, the objects 114 storing the data of the external tables T1, T2, and T3 are not in relational table format, in which case the DBMS 102 can convert the data of the objects 114 into relational table format. In other examples, the object(s) 114 storing the data of the external table T1 and/or T2 and/or T3 can be in relational table format.

In the example of FIG. 3, table T2 is a common external table referred to by multiple query blocks (302 and 304). Although FIG. 3 shows an example with two query blocks 302 and 304, it is noted that more than two query blocks in the database query 300 can refer to the common external table T2.

Also, there may be multiple common external tables referred to by multiple query blocks in the database query 300.

The external read reduction logic 130 builds (at 204) a common projection list 206 that is a union of the projections of columns of a common external table (e.g., T2 in FIG. 3) referenced by all of the query blocks (e.g., 302 and 304 in FIG. 3). A "union" of the projections of columns of the common external table referred to by the multiple query blocks forms a superset of all of the columns of the common external table that are referred to by the multiple query blocks. For example, in FIG. 3, the common projection list 206 includes columns T2.D, T2.E, T2.F, and T2.G, since these columns are part of the superset of columns included in the query blocks 302 and 304.

The external read reduction logic 130 builds (at 208) a common selection list 210 that is based on a disjunction of the selections of rows of the common external table (e.g., T2 in FIG. 3). A selection of rows of the common external table is based on a predicate included in a query block. For example, in the query block 302, rows of the common external table T2 are selected if the predicate T2.D=5 is satisfied. In the query block 304, rows of the common external table T2 are selected if the predicate T2.F>4 is satisfied.

The disjunction of the selections of rows of the common external table T2 in the query blocks 302 and 304 includes all of the predicates relating to the common external table T2 appearing in the query blocks 302 and 304. Thus, in the example of FIG. 3, the common selection list 210 includes predicates D=5 and F>4 (which appear in the query blocks 302 and 304, respectively).

The external read reduction logic 130 creates (at 212) a common spool block 214 that contains query logic with projections and selections based on the common projection list 206 and the common selection list 210.

FIG. 3 shows an example common spool block 306 created based on the common projection list 206 and the common selection list 210. According to FIG. 3, the common projection list 206 includes columns T2.D, T2.E, T2.F, and T2.G, and the common selection list 210 includes predicates D=5 and F>4.

Thus, the query logic in the common spool block 306 is set forth below:

```
SELECT F, G
FROM T2
WHERE T2.D=5 OR T2.F>4.
```

More generally, the query logic of a common spool block includes projections of columns of the common external table that are part of a union of the columns of the common external table that appear in the query blocks, and a predicate that includes a logical OR of the predicates in the common selection list 210.

As shown in FIG. 3, a result of the query logic in the common spool block 306 can be stored in a spool 308. As used here, a "spool" refers to storage in a DBMS for storing a result of a query logic. In some examples, the spool includes temporary storage that is temporarily allocated to store the result of the query logic.

In an example, FIG. 1 shows memories 124 associated with the respective processing engines 112. A "memory" can be implemented using a memory device or multiple memory devices, where memory devices can include any or some combination of: a dynamic random access memory (DRAM) device, a static random access memory (SRAM) device, a flash memory device, and so forth. As examples, where the processing engines 112 include processors, the memories 124 can be individually associated with the processors, such as connected to the respective processors over respective memory buses.

As further shown in FIG. 2, the external read reduction logic 130 rewrites (at 216) each of the query blocks of the database query to produce respective rewritten query blocks 218.

For example, in FIG. 3, the query block 302 is rewritten (310) as rewritten query block 302W. The rewritten query block 302W contains the same query logic as the query block 302, except that the rewritten query block 302W replaces the reference to the common external table T2 with a reference to the spool 308.

Similarly, the query block 304 is rewritten (312) as rewritten query block 304W, where the query logic of the rewritten query block 304W is the same as the query block 304 except the reference to the common external table T2 is replaced with a reference to the spool 308.

During an optimizer planning operation 220 performed by the optimizer 132 of FIG. 1, the optimizer 132 determines (at 222) the costs associated with executing the original query blocks of the received database query (e.g., 302 and 304 in FIG. 3). In the ensuing discussion, the cost of executing the query block 302 is designated C1, and the cost of executing the query block 304 is designated C2.

The optimizer 132 also determines (at 224) the costs associated with executing the query logic of the common spool block 214 (e.g., 306 in FIG. 3), and the costs associated with executing the rewritten query blocks 218 (e.g., 302W and 304W in FIG. 3). The cost of executing the common spool block 306 is designated C3, the cost of executing the rewritten query block 302W is designated C4, and the cost of executing the rewritten query block 304W is designated C5.

A "cost" determined by the optimizer 132 is based on any combination of one or more of the following factors: processing time, usage of processor resources, usage of memory resources, usage of communication resources (including communications over the network 108 to the remote data store 104), and/or other factors.

The optimizer 132 compares (at 226) the total cost (CT1) associated with executing the original query blocks 302 and 304, to the total cost (CT2) associated with executing the common spool block 306, and the rewritten query blocks 302W and 304W. The total cost CT1 is equal to the sum of C1 and C2 (CT1=C1+C2), and the total cost CT2 is equal to the sum of C3, C4, and C5 (CT2=C3+C4+C5).

If CT1 does not exceed CT2 (as determined at 228), then the optimizer 132 selects (at 230) a first query execution plan that involves executing the original query blocks (e.g., 302 and 304) of the database query (instead of using the common spool block 306 and the rewritten query blocks 302W and 304W).

However, if CT1 exceeds CT2 (as determined at 228), then the optimizer 132 selects (at 232) a query execution plan that involves executing the common spool block (e.g., 306) and the rewritten query block (e.g., 302W and 304W).

In some examples, the unused query logic blocks can be discarded by the optimizer 132. For example, if the original query blocks 302 and 304 are used, then the common spool block 306 and rewritten query blocks 302W and 304W can be discarded. On the other hand, if the common spool block 306 and rewritten query blocks 302W and 304W are used, then the original query blocks 302 and 304 can be discarded.

Note that in examples according to FIG. 1 in which there are multiple processing engines 112, the spool 308 can be distributed across the processing engines 112, and more specifically, stored in the memories 124 of the processing engines 112. The memories 124 can store different portions of the spool 308, in some cases. In other cases, where multiple processing engines 112 operate on a same subset of the data in the spool 308, this same subset of data can be copied (replicated) to the memories 124 associated with the processing engines 112.

The determination of where data is to be stored for processing by the processing engine 112 is determined by the optimizer 132. The locations of data can be specified in the query execution plan developed by the optimizer 132.

In accordance with some implementations of the present disclosure, a cost-based technique or mechanism is provided to select a query execution plan for a database query that includes multiple references to one or more common external tables in a remote data store (e.g., 104 in FIG. 1). The cost-based technique or mechanism seeks to reduce the amount of reads of external tables from the remote data store, such that redundant network communications of data of common external tables are reduced, and duplicative processing of data of common external tables by a DBMS is avoided or reduced.

Figure 4:
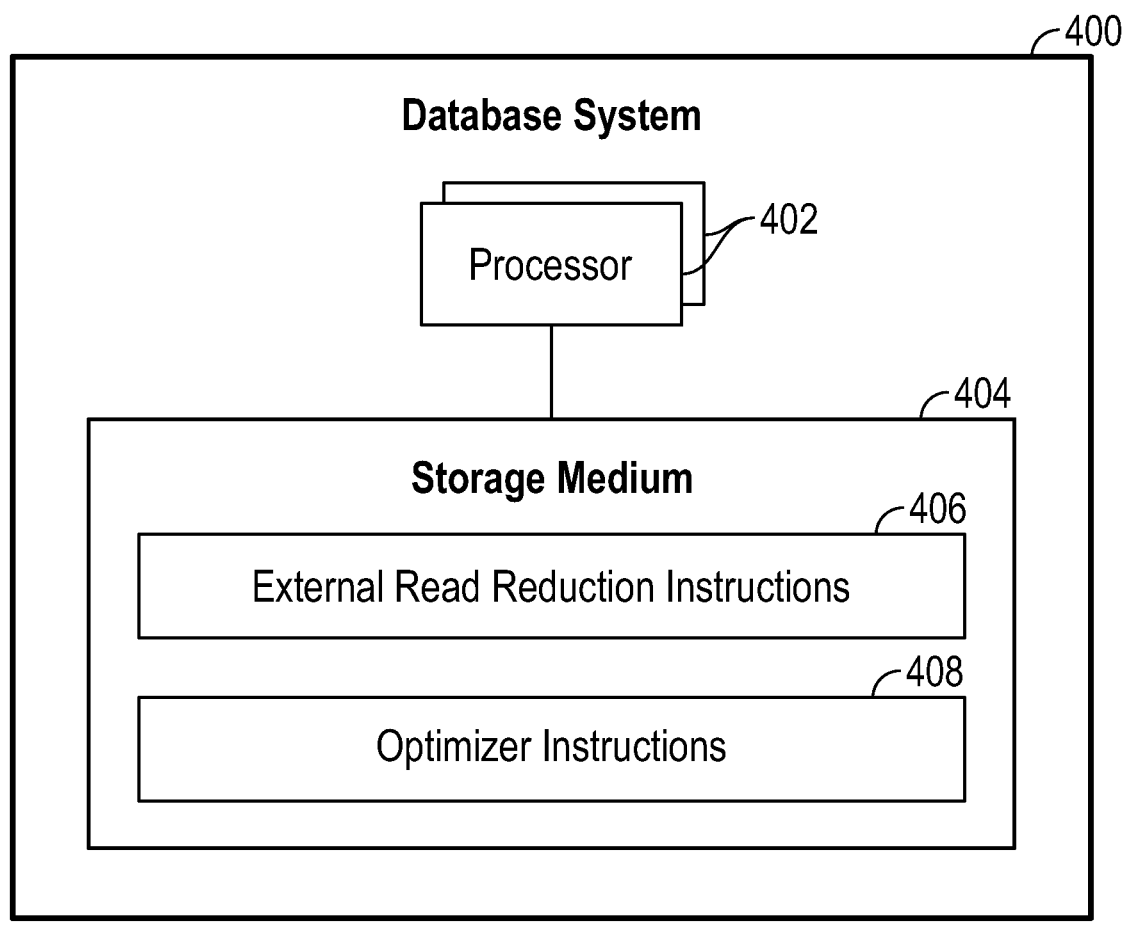
FIG. 4 is a block diagram of an example database system according to some implementations of the present disclosure.

FIG. 4 is a block diagram of a database system 400 (e.g., the DBMS 102 of FIG. 1) that includes one or more hardware processors 402. A hardware processor can include a microprocessor, a core of a multi-core microprocessor, a microcontroller, a programmable integrated circuit, a programmable gate array, or another hardware processing circuit. The one or more hardware processors 402 may be part of a processing engine 112 of FIG. 1, for example.

The database system 400 includes a non-transitory machine-readable or computer-readable storage medium 404 that stores machine-readable instructions executable on the one or more hardware processors 402 to perform various tasks.

The machine-readable instructions include external read reduction instructions 406 to identify a plurality of query portions in a database query that contain query logic (e.g., the query blocks 302 and 304 of FIG. 3) referring to a common external table, the common external table being based on data from a remote data store coupled to the database system 400 over a network. In some examples, the data from the remote data store includes one or more objects in non-relational format. In other examples, the data from the remote data store includes one or more objects in relational format.

The external read reduction instructions 406 create a common query logic (e.g., the common spool block 306 of FIG. 3) including projections and selections of the plurality of query portions.

The external read reduction instructions 406 rewrite the plurality of query portions into rewritten query portions (e.g., 302W and 304W in FIG. 3) that contain query logic referring to a spool (e.g., 308 in FIG. 3) containing an output of the common query logic.

The machine-readable instructions in the storage medium 404 further include optimizer instructions 408 that determine, as part of optimizer planning for execution of the database query, whether to use the plurality of query portions or the common query logic and the rewritten query portions. The determining of whether to use the plurality of query portions or the common spool portion and the rewritten query portions is performed on an individual query basis for the database query during processing of the database query (instead of being performed across multiple database queries).

In some examples, use of the common spool portion and the rewritten query portions avoids plural reprocessing of the data for a common external table in response to the plurality of query portions in the database query that contain references to the common external table.

In some examples, the determining of whether to use the plurality of query portions or the common query logic and the rewritten query portions is based on a comparison of a first cost associated with executing the plurality of query portions and a second cost associated with executing the common query logic and the rewritten query portions.

In some examples, the first cost associated with executing the plurality of query portions (e.g., original query blocks of the database query) is based on a sum of costs of executing respective query portions of the plurality of query portions, and the second cost associated with executing the common spool portion and the rewritten query portions is based on a sum of a cost of executing the common spool portion and costs of executing the rewritten query portions.

A storage medium (e.g., 120 and 124 in FIG. 1 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a database system to:
- identify a plurality of query portions in a database query that contain references to a first external table, the first external table being based on data from a remote data store coupled to the database system over a network;
- create a common spool portion containing query logic that comprises projections and selections of the plurality of query portions, the query logic of the common spool portion comprising:
  - a conjunction of the projections in corresponding query portions of the plurality of query portions, the conjunction of the projections in the corresponding query portions comprising a union of columns of the first external table that appear in the corresponding query portions, and
  - a disjunction of the selections in the corresponding query portions of the plurality of query portions;
- rewrite the plurality of query portions into rewritten query portions that refer to a spool containing an output of the common spool portion; and
- for execution of the database query, determine, as part of optimizer planning, whether to use the plurality of query portions or the common spool portion and the rewritten query portions.

2. The non-transitory machine-readable storage medium of claim 1, wherein the determining of whether to use the plurality of query portions or the common spool portion and the rewritten query portions is based on a comparison of a first cost associated with executing the plurality of query portions and a second cost associated with executing the common spool portion and the rewritten query portions.

3. The non-transitory machine-readable storage medium of claim 2, wherein the first cost associated with executing the plurality of query portions is based on a sum of costs of executing respective query portions of the plurality of query portions, and the second cost associated with executing the common spool portion and the rewritten query portions is based on a sum of a cost of executing the common spool portion and costs of executing the rewritten query portions.

4. The non-transitory machine-readable storage medium of claim 2, wherein the instructions upon execution cause the database system to:
- select use of the plurality of query portions in response the first cost not exceeding the second cost, and
- select use of the common spool portion and the rewritten query portions in response to the first cost exceeding the second cost.

5. The non-transitory machine-readable storage medium of claim 1, wherein the selections in the corresponding query portions are based on respective predicates in the corresponding query portions.

6. The non-transitory machine-readable storage medium of claim 5, wherein a predicate in the query logic of the common spool portion is a disjunction of the respective predicates in the corresponding query portions.

7. The non-transitory machine-readable storage medium of claim 5, wherein a predicate in the query logic of the common spool portion is a logical OR of the respective predicates in the corresponding query portions.

8. The non-transitory machine-readable storage medium of claim 1, wherein the spool referred to by the rewritten query portions comprises a temporary storage to store an output of the query logic in the common spool portion.

9. The non-transitory machine-readable storage medium of claim 1, wherein the database system comprises a plurality of processing engines to process the database query on respective portions of data of the spool stored in memories of respective processing engines of the plurality of processing engines.

10. The non-transitory machine-readable storage medium of claim 1, wherein the determining of whether to use the plurality of query portions or the common spool portion and the rewritten query portions is performed on an individual query basis for the database query.

11. The non-transitory machine-readable storage medium of claim 1, wherein the determining of whether to use the plurality of query portions or the common spool portion and the rewritten query portions is performed during processing of the database query.

12. The non-transitory machine-readable storage medium of claim 1, wherein use of the common spool portion and the rewritten query portions avoids plural reads of data from the first external table in response to the plurality of query portions in the database query that contain references to the first external table.

13. The non-transitory machine-readable storage medium of claim 1, wherein use of the common spool portion and the rewritten query portions avoids plural reprocessing of data from the first external table in response to the plurality of query portions in the database query that contain references to the first external table.

14. A database system comprising:
- at least one processor; and
- a non-transitory storage medium storing instructions executable on the at least one processor to:
  - identify a plurality of query portions in a database query that contain query logic referring to a common external table, the common external table being based on data from a remote data store coupled to the database system over a network;
  - create a common query logic including projections and selections of the plurality of query portions, the common query logic comprising:
    - a conjunction of the projections in corresponding query portions of the plurality of query portions, the conjunction of the projections in the corresponding query portions comprising a union of columns of the common external table that are referred to by the corresponding query portions, and
    - a logical OR of predicates in the corresponding query portions of the plurality of query portions;
  - rewrite the plurality of query portions into rewritten query portions that contain query logic referring to a spool containing an output of the common query logic; and for execution of the database query, determine, as part of optimizer planning, whether to use the plurality of query portions or the common query logic and the rewritten query portions.

15. The database system of claim 14, wherein the data from the remote data store comprises one or more objects in non-relational format.

16. The database system of claim 14, wherein the determining of whether to use the plurality of query portions or the common query logic and the rewritten query portions is based on a comparison of a first cost associated with executing the plurality of query portions and a second cost associated with executing the common query logic and the rewritten query portions.

17. A method of a database system comprising a hardware processor, comprising:

parsing a database query that identifies a plurality of query blocks in the database query that contain references to a common external table, the common external table being based on data from a remote data store coupled to the database system over a network;

creating a common query logic that comprises projections and selections of the plurality of query blocks, the common query logic comprising:

a conjunction of projections in corresponding query blocks of the plurality of query blocks, the conjunction of the projections in the corresponding query blocks comprising a union of columns of the common external table that are referred to by the corresponding query blocks, and a logical OR of predicates in the corresponding query blocks of the plurality of query blocks;

rewriting the plurality of query blocks into rewritten query blocks that refer to a spool containing an output of the common query logic; and for execution of the database query, determining, as part of optimizer planning, whether to use the plurality of query blocks or the common query logic and the rewritten query blocks.

\* \* \* \* \*